May 21, 1957      G. FEUILLET      2,792,942
PORTABLE APPARATUS FOR THE PURIFYING AND FILTERING OF WATER
Filed Oct. 16, 1953
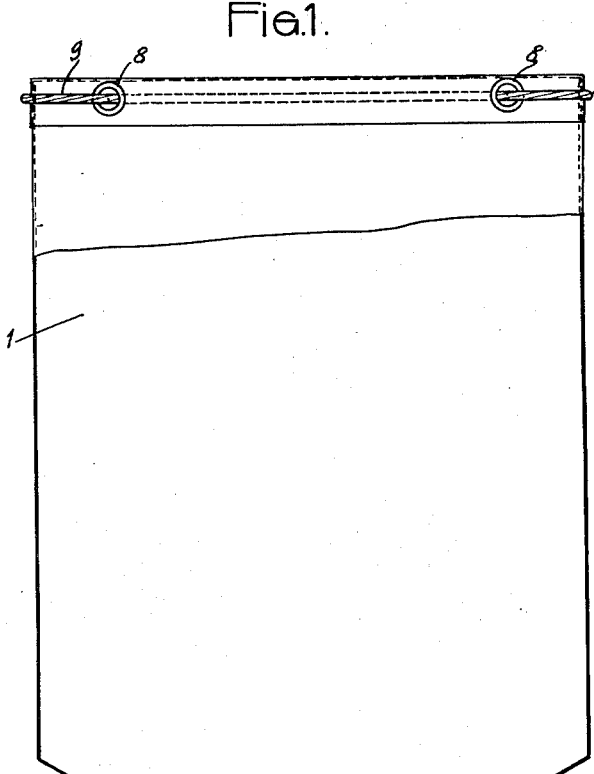
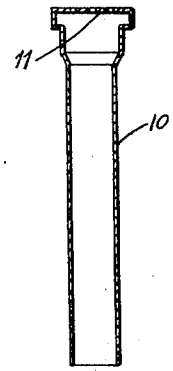
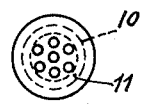
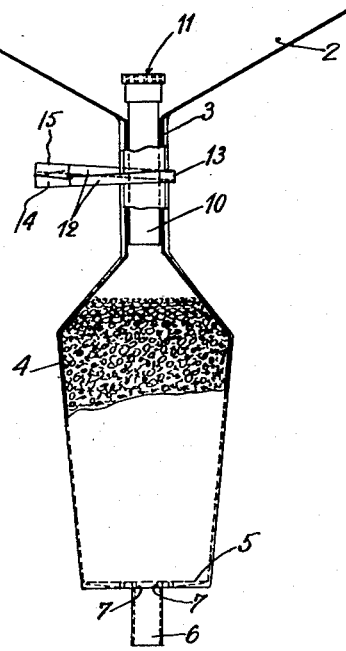
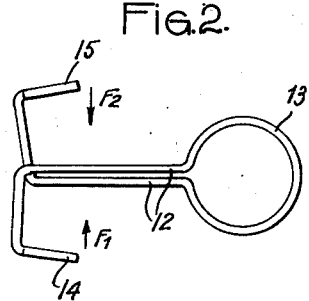
INVENTOR
GEORGES FEUILLET

United States Patent Office 2,792,942
Patented May 21, 1957

2,792,942

PORTABLE APPARATUS FOR THE PURIFYING AND FILTERING OF WATER

Georges Feuillet, Saint-Mandé, France

Application October 16, 1953, Serial No. 386,543

Claims priority, application France April 14, 1953

2 Claims. (Cl. 210—257)

The water used by soldiers and campers is taken, in general, from a well, or a spring, or a brook and such water very often, is unfit for drinking.

Purifying and filtering apparatus has already been proposed for such users, but said apparatus was heavy, bulky and fragile. Further, products have been proposed, for asepticizing water, but said products give an unpleasant taste to the water.

The present invention obviates these drawbacks by creating a portable apparatus for the purifying and filtering of water and the elimination of antiseptic products in excess, said apparatus being simple, light, sturdy, unbreakable, and of a small bulk when suitably folded.

In accordance with the invention, the apparatus consists in a bag, terminating, at its lower portion, into a convergent portion extended by an appendage opening into a pocket containing a product for the filtering of water, said pocket offering, at its lower portion, at least one hole for the flow of filtered water.

Various other characteristics of the invention appear from the following detailed description.

One form of embodiment of the object of the invention is shown, by way of example, in the appended drawing.

Figure 1 is a side elevation, partly in section, of the apparatus.

Figure 2 is a plan, to a larger scale, of one element of the apparatus.

Figure 3 is a sectional elevation, to a larger scale, of another element of the apparatus.

Figure 4 is a plan of the element of Figure 3, as seen from above.

The apparatus consists essentially of a bag 1, ending, at its lower end, into a convergent portion 2. An appendage 3, associated with the lower end of the convergent portion 2 of the bag 1, is associated with a pocket 4 containing a product which filters the water. A tube 6 is secured at the middle of the bottom 5 of the pocket 4. Holes 7, provided in the bottom 5 of the pocket 4, place the latter into communication with the tube 6. The upper edge of the bag 1 is fitted with eyelets 8 allowing the passing of a cord 9 for supporting the apparatus when the latter is hooked on a support of any type. A tube 10, provided at its upper end with a strainer 11 is placed in the appendage 3 in such a manner that the strainer 11 be housed in the bag 1. 12 is a pincer comprising at its rear portion, a ring 13. Blades 14, 15 make it possible to seize the pincer 12.

The apparatus operates as follows:

For filtering and purifying water by means of the apparatus according to the invention, the latter is hooked through the cord 9 on a support of any kind, for instance a tree branch. The zone of junction of the appendage 3 and pocket 4 is then pinched by means of the pincer 12. The two branches of this pincer clamp tightly against one another the walls of the upper portion of the pocket 4 below the bottom of the tube 10. The bag 1 is filled with water; this water flowing through the strainer 11 goes down to the lower end of the appendage 3 below tube 10 but cannot enter the pocket. Mud and other impurities contained in the water are deposited in the bottom of the bag, around the tube 10, under the strainer 11.

An antiseptic product is added to the water, such as a chlorated derivative, for example. When said antiseptic product has produced its effect, the pincer 12 is released by pressing in the directions of the arrows $F^1$, $F^2$ on the blades 14, 15 (Figure 2) and moved upwardly to the position shown in Fig. 1. The water which flows through the strainer 11 and tube 10 enters the pocket 4 containing the absorbing product which eliminates, by fixation, the excess of antiseptic product, chlorine, for instance, and flows away, after treatment, through the holes 7 and the tube 6 into a container placed under the latter tube.

The pocket 4 contains, generally, activated carbon for filtering water, but it may contain any other equivalent product.

The apparatus is built out of plastic material, unbreakable and rot-proof.

The pincer 12 is made out of a corrosion resistant metal.

Various modifications may be made to the form of embodiment given by way of example, within the scope of the invention. For example, the tube 10 may be made of flexible material in which case it may be squeezed with the appendage 3 to prevent the water from flowing from bag 1 into pocket 4. When mud and other impurities are deposited in the bottom of the bag around the upper portion of tube 10 under the strainer 11, the pincer 12 is removed and the water will pass through tube 10 and enter pocket 4 for filtering purposes.

I claim:

1. A portable apparatus for the purifying and filtering of water, comprising a reservoir made of flexible water tight material, said reservoir being open at its upper portion and closed at its lower portion by a bottom forming a tubular appendage, a pocket for containing a filtering material, said pocket being made of flexible material and connected with said tubular appendage, a portion of the bottom of said pocket having small holes preventing the passage of the filtering material but allowing passage of water, a collector tube arranged under said bottom and in communication with said pocket through said holes, a tubular element engaged in the tubular appendage, a strainer fastened on said tubular element and protruding above the bottom of said reservoir, and a pincer forming a loop and having jaws adjacent said loop, said pincer being mounted on the tubular appendage to cut off and to open the communication between said reservoir and said pocket.

2. A portable apparatus for the purifying and filtering of water, comprising a reservoir, a tubular appendage on the lower portion of said reservoir, a pocket connected in sealed relation with said tubular appendage, said pocket being provided, at its lower portion with orifices for discharging water from the pocket; the reservoir, the tubular appendage and the pocket being made of foldable, unbreakable plastic material a substantially rigid tubular element within the tubular appendage, a strainer fastened on the top of said tubular element so that the strainer is positioned above the bottom of said reservoir, and a pincer arranged on the tubular appendage to either engage the appendage below the tubular element and cut off communication between the reservoir and pocket, or to slide upwardly on the tubular appendage above the bottom of the tubular element and open communication between the reservoir and pocket.

(References on following page)

References Cited in the file of this patent

UNITED STATES PATENTS

| | | |
|---|---|---|
| R. 17,641 | Owens | Apr. 8, 1930 |
| 1,208,882 | Young | Dec. 19, 1916 |
| 2,063,086 | Fitz Gerald | Dec. 8, 1936 |
| 2,711,994 | Quinn | June 28, 1955 |

FOREIGN PATENTS

| | | |
|---|---|---|
| 9,352 | Great Britain | 1886 |
| 16,259 | Great Britain | 1909 |
| 479,062 | France | Nov. 16, 1915 |